(12) United States Patent
Howlid et al.

(10) Patent No.: US 7,230,878 B2
(45) Date of Patent: Jun. 12, 2007

(54) METHODS AND APPARATUS FOR SEABED SEISMIC DATA ACQUISITION

(75) Inventors: Martin Howlid, Slependen (NO); Leendert Combee, Oslo (NO); Aslaug Strømmen Melbø, Oslo (NO); Nicolas Goujon, Oslo (NO)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 11/349,781

(22) Filed: Jan. 19, 2006

(65) Prior Publication Data

US 2007/0076524 A1    Apr. 5, 2007

Related U.S. Application Data

(60) Provisional application No. 60/723,107, filed on Oct. 3, 2005.

(51) Int. Cl.
*G01V 1/00* (2006.01)
*G01V 1/38* (2006.01)

(52) U.S. Cl. .................................. 367/20; 181/110

(58) Field of Classification Search ............. 367/15, 367/16, 20; 181/110
See application file for complete search history.

(56) References Cited

U.S. PATENT DOCUMENTS

| | | | | |
|---|---|---|---|---|
| 3,613,071 A | * | 10/1971 | Quay | 367/20 |
| 3,629,801 A | * | 12/1971 | Brede | 367/48 |
| 4,438,401 A | | 3/1984 | Iwamoto et al. | |
| 4,649,530 A | | 3/1987 | Porter, Jr. | |
| 4,737,937 A | * | 4/1988 | Keckler et al. | 367/20 |
| 5,668,775 A | | 9/1997 | Hatteland | |
| 5,747,754 A | | 5/1998 | Svenning et al. | |
| 5,784,337 A | | 7/1998 | Rainey et al. | |
| 5,943,293 A | | 8/1999 | Luscombe et al. | |
| 6,146,052 A | | 11/2000 | Jacobsen et al. | |
| 6,388,948 B1 | | 5/2002 | Vincent | |
| 6,775,203 B2 | | 8/2004 | Fageras et al. | |
| 2004/0013036 A1 | | 1/2004 | Fageras et al. | |
| 2004/0081018 A1 | | 4/2004 | Sawin et al. | |

FOREIGN PATENT DOCUMENTS

| | | |
|---|---|---|
| GB | 751568 | 6/1956 |
| GB | 1 348 401 | 3/1974 |
| GB | 2 378 759 | 2/2003 |

OTHER PUBLICATIONS

UK Search Report dated Jan. 17, 2007 for Application No. GB 0619404.7.

* cited by examiner

*Primary Examiner*—Mark Hellner

(57) ABSTRACT

Methods and apparatus for acquiring seismic data using a seabed seismic data cable positioned on a seabed are described, one method including deploying a seabed seismic cable, the cable comprising two or more active sections separated by at least one jumper section; and acquiring seabed seismic data using the seabed seismic cable. Certain methods include analyzing spacing needed between active sensor units in the active sections prior to deploying the seabed seismic cable, and selecting a length of the jumper section based on the analysis. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

19 Claims, 2 Drawing Sheets

METHODS AND APPARATUS FOR SEABED SEISMIC DATA ACQUISITION

CROSS-REFERENCE TO RELATED APPLICATIONS

The present application claims priority under 35 U.S.C. § 119(e) to U.S. Provisional Application Ser. No. 60/723,107, filed Oct. 3, 2005, incorporated by reference herein in its entirety.

BACKGROUND OF THE INVENTION

1. Field of Invention

The present invention relates generally to the field of seismic data acquisition, in particular but not necessarily restricted to alternative methods and apparatus for acquiring seabed seismic data using permanent seabed seismic data acquisition cables.

2. Related Art

Marine seismic exploration investigates and maps the structure and character of subsurface geological formations underlying a body of water. In so-called seabed seismic data acquisition, a cable containing seismic receivers is deployed onto the seabed from a surface vessel for the period over which seismic data acquisition will last. This may be anywhere from several days to several weeks. One specific application of seabed seismic acquisition is called permanent seabed seismic for time-lapse seismic data acquisition. In this case, the cable is deployed on the seabed—or alternatively trenched in the seabed—for permanent or semi permanent use.

In all seabed seismic surveys to date, permanent and retrievable, the cables that are used have an equidistant spacing between sensor units. Since one and the same cable may be used in many different environments with different spatial sampling requirements, usually a cable is designed to meet the most common and demanding requirements. For example, the newest generation of seabed seismic cables all offer a 25 m spacing between sensor units. However, it is well known that in many cases such a close proximity between sensor units is not needed and a sparser spatial sampling of the seismic wavefield is acceptable without leading to a significant loss in seismic data quality. In certain instances it would be desirable to have some flexibility in seabed cable data acquisition geometry that can be tuned to the survey and subsurface characteristics. This is for several reasons, most importantly standardization in the manufacturing process and ease of processing the seismic data.

SUMMARY OF THE INVENTION

In accordance with the present invention, methods and apparatus for seabed seismic data acquisition are described which reduce or overcome many of the shortcomings of presently used methods and apparatus. The methods and apparatus of the invention may be employed to achieve a flexible acquisition geometry that can be tuned to the survey and subsurface characteristics. Methods and apparatus of the invention may be used to collect marine seismic data, including but not limited to 3-D and time-lapse (4-D) marine seismic data.

A first aspect of the invention are methods, one method comprising:
(a) deploying a seabed seismic cable, the cable comprising two or more active sections separated by at least one jumper section; and
(b) acquiring seabed seismic data using the seabed seismic cable.

Methods of the invention include those comprising analyzing spacing needed between active sensor units in the active sections prior to deploying the seabed seismic cable, and methods wherein the deploying step comprises selecting a length of the jumper section. In yet other methods of the invention, the length of each jumper section deployed is selected to be equal for each jumper section, and only one jumper section is deployed between each active section. In certain other embodiments, the length of each jumper section deployed is selected to be different for each jumper section, and only one jumper section is deployed between each active section. The length of each jumper section may or may not be selected to be equal, and two or more jumper sections are deployed between each active section. The deployment step may comprise deploying a first portion of the seabed seismic cable having a first length of jumper section, followed by deploying a second portion of the seabed seismic cable having a second length of jumper section. The first length of jumper section and the second length of jumper section may or may not be made up of one or more standard length jumper sections. The first length of jumper section may comprise a first standard length of jumper section and the second length of jumper section may comprise a second standard length of jumper section. More than two standard lengths are possible.

Another aspect of the invention are methods of acquiring seabed seismic data, one method comprising the steps of:
(a) deploying a seabed seismic cable, the cable comprising two or more active sections separated by at least one jumper section, each active section having a plurality of sensor units;
(b) activating some of the sensor units and deactivating other sensor units to increase spacing between active sensor units; and
(c) acquiring seabed seismic data using the active sensor units.

A third aspect of the invention are apparatus comprising:
(a) one or more active seabed seismic cable sections; and
(b) one or more jumper sections removably connected between successive active sections.

Apparatus in accordance with the invention may include a plurality of sensor units, which may be inside the cable body, or the sensor units may comprise sensor elements within housings, the housings fastened to the cable. In either case the sensor units may be spaced along the cable. The jumper sections may or may not be equal in length. The jumper sections may be a standard length. Apparatus of the invention may include more than one standard length of jumper section.

Methods and apparatus of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
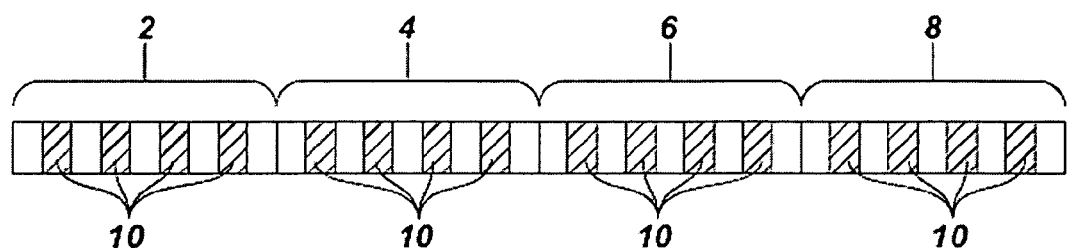
FIG. 1 is a schematic drawing of a prior art seabed seismic cable with 100 m active sections, each with four sensor units at 25 m interval.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes seismic seabed cables and methods of using same to reduce the effects of water flowing past the cables during swift current events. Certain cables of the invention include elements that shed vortices, reduce drag, and reduce lifting forces on the cable. Other cables of the invention include members that promote stability of the cables in the crossline direction, while yet other cables of the invention have exterior shapes allowing fluids to pass between the cable and the seabed. Finally, seabed seismic cables of the invention include those wherein a combination of two or more of these features is employed. While the terms "seabed" and "seafloor" are used herein, it will be understood by those of ordinary skill in the art that the invention is not limited to use of seismic cables on seabeds or seafloors, but the apparatus and methods may be used in all types of water and liquids and all types of terra firm a permanently or temporarily under water or other liquid (such as water/oil mixtures, emulsions, chemicals, and the like), including but not limited to fresh water, oceans, seas, transition zones, tidal zones, lagoons, lakes, rivers, bays, gulfs, channels, inlets, fjords, lochs, streams, marshes, creeks, indeed anywhere shear wave seismic data is desired and where seabed seismic cable may be effective to gather seismic data.

As previously mentioned, in many cases a close proximity between sensor units of a seabed seismic cable is not needed and a sparser spatial sampling of the seismic wavefield is acceptable without leading to a significant loss in seismic data quality. For example, it could be that in the vicinity of a production facility where high-resolution information of the subsurface is required a sensor unit interval of 25 m is desirable, while further away the spacing between sensor units may be increased to 100 m or 200 m. Since a increase in distance between sensor units will reduce the total cost of equipment, it is quite attractive especially for permanently deployed seabed seismic cables to provide flexible spacing between sensor units. This allows one to reduce and optimize the cost of the permanent seismic installation without necessarily compromising the quality of the subsurface seismic image. Prior to the present inventive methods and apparatus, providing a variable spacing between sensor units could only be performed with great difficulty and expense. In theory, it was and still is possible to design and manufacture cable sections with different number of sensor units (for example sections with four sensor units per 100 m for 25 m spacing; sections two sensor units per 100 m for 50 m spacing and sections with only one sensor unit per 100 m for a 100 m spacing) but this is not practical. In addition, one particular drawback with such a design is that in the case of sensor unit failure, the distance between the neighboring sensor units is immediately doubled. Prior designs have no redundancy for sensor unit failure.

The present inventive methods and apparatus seek to reduce or completely overcome this problem, and are henceforth described in detail. In particular, methods and apparatus of the invention address the need of local redundancy, ease of manufacturing, and cost considerations. Methods and apparatus of the present invention include the use of seismic cable sections without any seismic sensor units to act as jumper sections between so-called active sections, defined as seismic cable sections having at least one sensor unit that may collect seismic data. The latter may be any of the various standard cable sections with sensor units at, say, every 25 m.

In between all or substantially all active sections may be one or more jumper sections. Because the jumper sections by definition do not contain any integral seismic sensor units (i.e., cables manufactured with sensor units inside the cable or clamped to the outside surface of the cable) they may be manufactured with relative ease and lower cost, and—if desired—in various lengths. That is not to say the jumper sections may never comprise seismic or other type of sensors. For example, accelerometers, magnetic detection devices, bar codes, pressure sensors, temperature sensors, or other sensor devices might be embedded inside a jumper cable section during manufacture. In addition, a jumper section may have clamped thereon a seismic sensor unit as desired, for example, when a sensor unit in a seabed seismic cable fails during a data acquisition run, fails during deployment, or failed during a previous data acquisition run and was not repaired, or not repaired properly so as to be operative for the specific survey to be undertaken.

Two or more jumper sections may be connected in series to provide a longer interval between active sections. Because the active sections may contain a plurality of sensor units, redundancy is a characteristic of the methods and apparatus of the invention in instances where an individual sensor unit fails. It is also possible to use all sensor units within an active section for local processing of the recorded seismic wavefield, for example for noise attenuation purposes. This is not possible in a similar way when there is only one sensor unit.

Jumper sections may be used for permanent, semi-permanent, or temporary seabed seismic cable installations, and may be trenched or untrenched. The cable configuration may be determined and constructed before deployment, therefore there is no requirement for change during deployment or at a later stage. However, in semi-permanent applications where a seabed seismic cable is deployed on the seabed for a limited time (1-2 years) after which it is retrieved, the methods and apparatus of the present invention provide a flexible solution to reduce and optimize the cost of the data acquisition without affecting the quality of the seismic data.

As far as known to the present inventors, jumper sections and jumper cables have never before been known or suggested to be used in seabed seismic cables or methods of gathering seabed seismic data. One reason for this is that there was no obvious solution to the compromise between flexibility, cost, standardization of manufacturing processes, redundancy, and locally dense sampling. However, methods and apparatus of the present invention reduce or overcome many of these obstacles.

Table 1 summarizes various combinations of spacing between sensor units and jumper section lengths to achieve a series of final spacing between active sensor units. It can be seen that a 50 m long jumper cable gives the most flexibility for both 25 m and 50 m sensor unit spacings. 100 m or possibly 75 m long jumper sections may be used instead to create larger spacings between active sections with fewer jumper sections. The methods and apparatus of the invention are not limited by these lengths.

TABLE 1

Variable Spacing Between Active Sensor Units

|  | 25 m spacing in active cable | 50 m spacing in active cable |
|---|---|---|
| 75 m interval | 50 m jumper section |  |
| 150 m interval | 50 m jumper section | 50 m jumper section |
| 200 m interval | 2 × 50 m or 100 m jumper section | 2 × 50 m or 100 m jumper section |
| 250 m interval | 2 × 75 m or 150 jumper section | 2 × 75 m or 150 jumper section |

The figures illustrate a number of non-limiting jumper section configurations that may be used in combination with active sections to provide desired sensor unit spacing.

FIG. 1 is a schematic drawing of a prior art seabed seismic cable with 100 m active sections 2, 4, 6, and 8, each with four sensor units 10 at 25 m interval. It will be understood that more or less than four active sections may be used, that more or less than four sensor units per action cable section may be used, that the spacing between sensor units may be more or less than 25 m, and this is but one specific representative example of a prior art seismic cable that may benefit from the teachings of the present invention. These generalizations apply as well to the specific embodiments of the invention discussed herein in reference to FIGS. 2-4.

Figure 2:
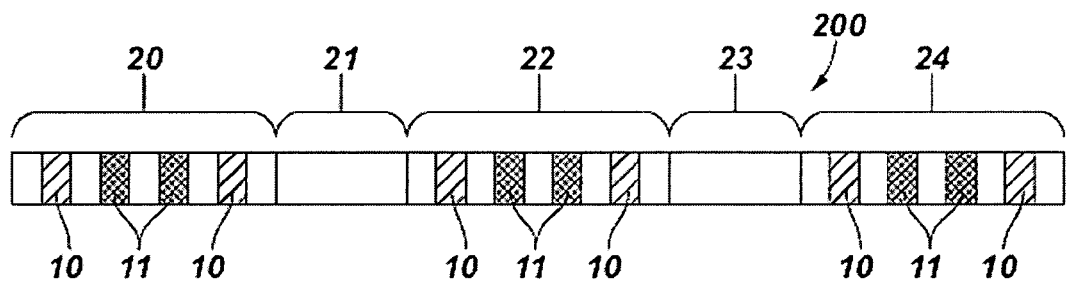
FIGS. 2, 3, and 4 are schematic drawings of three embodiments of the invention.

FIG. 2 is an example of an embodiment 200 of a seabed seismic cable and method of the invention with 100 m active sections 20, 22, and 24, each having two active sensor units 10 and two inactive sensor units 11, and 50 m jumper sections 21 and 23 in between each active section. In this way, the spacing between active sensor units 10 is effectively increased to 50 m.

Figure 3:
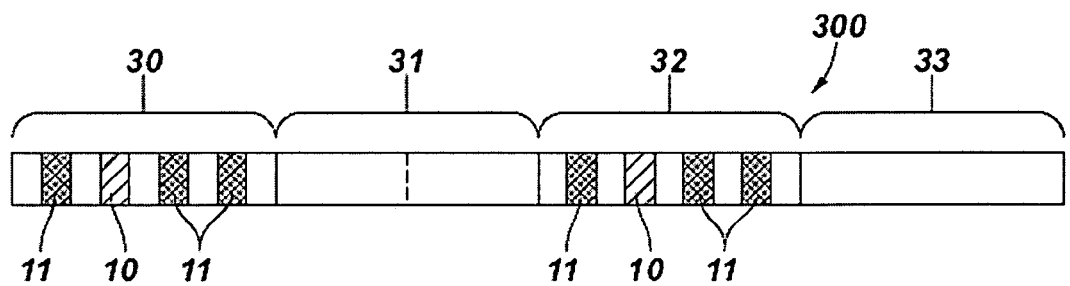

FIG. 3 is an example of an embodiment 300 of a seabed seismic cable of the invention with 100 m active sections 30 and 32, and 100 m jumper sections 31 and 33 in between each active section. In this way the spacing between active sensor units 10 is effectively increased to 200 m, with inactivated sensor units indicated at 11. It is also possible to use two 50 m jumper sections in series, as indicated by the dashed line.

Figure 4:
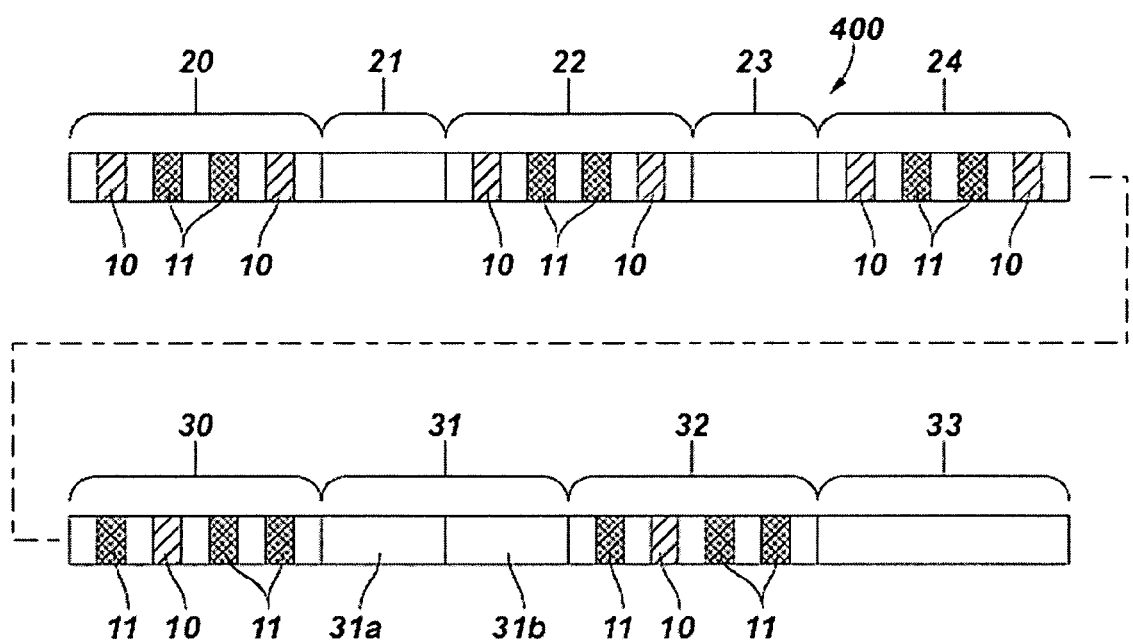

FIG. 4 illustrates further optional features of apparatus and methods of the invention in embodiment 400. Embodiment 400 is essentially a combination of embodiments 200 and 300. Other combinations are possible, such as combinations of any of the various illustrated and non-illustrated embodiments of the invention with the prior art seabed seismic cable of FIG. 1.

Seabed seismic cables of the invention may employ various fairings, such as so-called hairy fairings described in applicant's co-pending U.S. application Ser. No. 11/128,044, filed May 12, 2005, incorporated by reference herein for its teaching of various seabed seismic cable varieties. Fairing may be used on either or both active sections and jumper sections. Hairy fairing may comprise undulating strands of material, which may flap up, down and all around under strong current, much like strands of string in a strong wind, or the tail of a kite. The strands may be attached separately, after manufacture of the seismic cable, or they may be loosened from the skin of the cable, which might be a braided material. Seabed seismic cables of the invention may have circular grooves or channels in the cable skin, or in a sleeve around the cable skin. Alternatively, the channels may be part of a helical groove.

Seabed seismic cables of the invention may have an exterior surface shape that defines a plurality of shaped channels formed in the cable in the crossline (y) direction. The exterior shape of the cable, including channels, creates multiple paths for fluid to travel between the cable and the seabed substantially in the crossline direction. The width and depth of the channels or other shape perturbations may be uniform or non-uniform from channel to channel, and channels may be spaced uniformly or non-uniformly along cable in the inline, or (x) direction. Furthermore, channels need not extend the entire circumference around the cable. Channels are not limited to any particular shape, cross-section, length, width, depth, or volume.

Other seabed cable embodiments of the invention may comprise members such as pointed cones protruding from the exterior surface of the cable. Either or both active and jumper cable sections may employ these features. Other possible shapes for the protruding members include pyramids, such as 3-sided or 4-sided pyramids, although the shape is not limited to any of these shapes, and more than one shape may be used on any cable, or similar shapes but having a variety of sizes may be used. The protruding members dig into the seabed, while other members are shown as being on a substantially impervious portion of the seabed, perhaps a rocky outcropping. In certain embodiments, protruding members have a double function of providing channels between members, and substantially reducing rolling and translational movement of cables on seabed in the crossline direction. Fairing elements may be added to these embodiments as well, thus introducing the vortex shedding function, as well as providing channels between cables and seabed and a motion reducing function.

Older ocean bottom cables were comprised only of a hydrophone and a vertically oriented geophone strapped to the outside. More recent versions of seismic seabed cables typically comprise an instrumented cable packed with receivers in so-called "active sections", similar to the streamers that are towed in conventional marine surveys, but designed to operate on the seafloor. One seabed cable, known under the trade designation "NESSIE 4C", available from WesternGeco L.L.C., Houston, Tex., contains multiple sensing units each containing one hydrophone and three orthogonally oriented geophones inside the cable, distributing their weight for optimal coupling to the seafloor. This design was an improvement over the older ocean bottom cables. Other seabed seismic cable designs comprise separate support and signal cables, which help to acoustically decouple the sensors from the support cable. The function of support cable and seismic cable are sometime included in a single construction during the manufacture of the cable, and signal leads in this type of cable may be exposed and connected to sensors units.

Other than the inventive features discussed herein, seabed seismic sensors and, if present, their support cables (herein referred to collectively as seabed seismic cables) useful in the invention include those described in the article "Shear Waves Shine Brightly", Oilfield Review, pages 2-15 (1999), and typically comprise an instrumented cable packed with receivers, similar to the streamers that are towed in conventional marine surveys, but designed to operate on the seafloor. One seabed seismic cable, known under the trade designation "NESSIE 4C", contains multiple sensing units each containing one hydrophone and three orthogonally oriented geophones inside the cable, distributing their weight for optimal coupling to the seafloor. Each cable may house hundreds of four-component sensors. Full particle-motion vector recording of all P (pressure) and S (shear) wavefronts may be achieved, along with the pressure wavefront familiar from towed streamers. This design was an improvement over conventional ocean bottom cables, which may be employed in the present invention as well, comprising only a hydrophone and a vertically oriented geophone strapped to the outside; however, this arrangement is incapable of recording the full particle-motion vector and may not couple adequately to the seafloor. Published Patent Cooperation Treaty application no. WO 02/14905 A1, published Feb. 21, 2002, assigned to WesternGeco LLC, Houston, Tex. describes a seabed sensor unit and support cable that may have improve coupling to the seabed. The sensor unit may comprise one or more sensing elements disposed within a protective housing having a flat base. A flat base ensures that there is an adequate contact area between the sensor housing and the earth's surface, so that there is good acoustic coupling to the sensing element(s) mounted within the sensor housing. The housing may be attached to a support cable. Furthermore, the dimensions of the base of the housing may be chosen so that the extent of the base in a direction parallel to the cable is similar to the extent of the base in a direction perpendicular to the cable, which may minimize the dependence of the acoustic coupling to the sensor housing, and thus to sensing elements within the housing, on the angle between the incident seismic energy and the cable.

Another seabed cable useful in the invention is described (except for the inventive concepts described herein) in U.S. Pat. No. 6,021,091, also assigned to WesternGeco, LLC, which describes an elongated ocean-bottom seismic cable section of a desired length manufactured by assembling a stress member in combination with a plurality of signal communication channels. A plurality of receiver clusters is fastened to the assembly at desired intervals. Each cluster includes at least two multi-axial, gimbal-supported seismic receivers that are symmetrically mounted about the axis of the cable assembly. Output signals from the common axes of the respective multi-axis receivers of each cluster are coupled with each other through a suitable filter and linked to corresponding signal communication channels. The cable section is terminated by connectors for providing mechanical and communication linkage to other sections and eventually to signal-processing instrumentation.

The fairing elements, if used, may be manufactured during the manufacture of the cable, or added afterwards. Methods of making cables having fairing elements, such as braided hair faired cables, are not the subject of the invention, these methods being known from publications such as U.S. Pat. Nos. 3,440,991; 3,975,980; and 4,756,270. These publications discuss the benefits of fairing of towed cables, but do not suggest jumper sections and methods of using same to acquire shear wave data as in the present invention. Desired properties of the fairing elements include the ability to shed vortices, reduce drag, and reduce lift force on the seabed cable. The cable may be water tight, armored, and carry sufficient number of wires or optical fibers to carry acoustic data from the sensors in the cable to a data collection unit. Methods of making cables having protruding members are also known. The cables of the invention may have a minimum working strength of 4000 pounds and minimum breaking strength of 8000 pounds, and may have separate electrical (or fiber optic) and mechanical terminations to provide strain relief for electrical (or fiber optic) connectors and to enable the electrical or optical connectors to be connected and disconnected while maintaining a working strength tension. The cables may be faired along their whole length, or only portions of their length. The fairing may be 4 or more times the cable diameter. If hairy fairing is used, the cable may have a braided jacket with fiber "hairs" adapted to extend form the cable, and the fairing elements may vary in length and density. The elements can be single, double, four-sided, or any number of sided versions. The buoyancy of the cables and fairing elements should be such that the elements lie on the cable and/or seabed when there is slow current, and are able to extend substantially perpendicular to the cable under the influence of strong current, especially those elements at or near the top of the cable as it lies on the seabed. Those elements that are on the upstream side may be tucked under the cable and prevent the disturbances discussed earlier.

The cable active sections and jumper sections may be made of any natural or synthetic material. Useful synthetic materials include thermoplastic elastomers, such as polyurethane thermoplastic elastomers, polyester thermoplastic elastomers, and ionomeric thermoplastic elastomers. The synthetic materials may have additives therein which reduce or prevent fouling of these elements. Thermoplastic elastomers are defined and reviewed in Thermoplastic Elastomers, A Comprehensive Review, edited by N. R. Legge, G. Holden and H. E. Schroeder, Hanser Publishers, New York, 1987. Thermoplastic elastomers (as defined by Legge et al. and used herein) are generally the reaction product of a low equivalent weight polyfunctional monomer and a high equivalent weight polyfunctional monomer, wherein the low equivalent weight polyfunctional monomer is capable on polymerization of forming a hard segment (and, in conjunction with other hard segments, crystalline hard regions or domains) and the high equivalent weight polyfunctional monomer is capable on polymerization of producing soft, flexible chains connecting the hard regions or domains. "Thermoplastic elastomers" differ from "thermoplastics" and "elastomers" (a generic term for substances emulating natural rubber in that they stretch under tension, have a high tensile strength, retract rapidly, and substantially recover their original dimensions) in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics. Some commercially available thermoplastic elastomers include segmented polyester thermoplastic elastomers, segmented polyurethane thermoplastic elastomers, segmented polyurethane thermoplastic elastomers blended with other thermoplastic materials, segmented polyamide thermoplastic elastomers, and ionomeric thermoplastic elastomers.

The seabed seismic cables of the invention comprising jumper sections may also have advantages when the cable is in the water column during deployment in that they may experience less drag and vibration, may be easier to position the cable at pre-plot location, and may produce less noise on the seismic channels during deployment, making it easier to run acoustic positioning during deployment to help achieve accurate positioning of the seabed cable. If fairing is used, another advantage is that the cable can withstand higher currents before it starts moving. This will allow seismic acquisition in areas or period of time (tides) where it would not have been possible. It will limit the need for cable relaying and repositioning. Cables of the invention comprising optional protrusion members may provide better coupling of the cable to the seafloor, resulting in better data quality, and less noise from current on the seismic channels, as there will be less turbulence around the cable. The fairing elements may also help protect the cable against abrasion and cuts in case of dragging on the seafloor, particularly when thermoplastic elastomers are used for cable outer skin, protrusion members, and fairing elements. The fairing may also be beneficial for the parts of the cable that might not be in contact with the seafloor (some parts may be hanging because of seafloor topography, or hanging at the end of a sensor housing). The fairing then serves its function of reducing drag and strumming.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A method of acquiring seabed seismic data, the method comprising the steps of:
   (a) deploying a seabed seismic cable, the cable comprising two or more active sections separated by at least one jumper section, each active section having a plurality of sensor units;
   (b) activating some of the sensor units and deactivating other sensor units to increase spacing between active sensor units; and
   (c) acquiring seabed seismic data using the seabed seismic cable.

2. A seabed seismic data acquisition cable comprising:
   (a) one or more active seabed seismic cable sections each having a plurality of seabed seismic sensors, at least some of the seabed seismic sensors in each active seabed seismic cable section deactivated; and
   (b) one or more jumper sections removably connected between successive active sections.

3. A method comprising:
   (a) determining spacing required between active seabed sensor units in a seabed seismic cable in accordance with a planned seabed seismic survey;
   (b) selecting the seabed seismic cable, according to the spacing required, using one or more active seabed seismic sensor sections comprising the active seabed sensor units, the active seabed seismic sensor sections separated by at least one jumper section, wherein the spacing required is accomplished through a combination of the at least one jumper section and one or more deactivated seismic sensor units in at least some of the active sensor sections;
   (c) deploying the seabed seismic cable; and
   (d) acquiring seabed seismic data using the seabed seismic cable.

4. The method of claim 3 wherein the designing step comprises selecting a length of the jumper section.

5. The method of claim 4 wherein the length of each jumper section is selected to be equal for each jumper section, and only one jumper section is between each active section.

6. The method of claim 4 wherein the length of each jumper section is selected to be different for each jumper section, and only one jumper section is between each active section.

7. The method of claim 4 wherein the length of each jumper section is selected to be equal, and two or more jumper sections are between each active section.

8. The method of claim 3 wherein the deployment step comprises deploying a first portion of the seabed seismic cable having a first length of jumper section, followed by deploying a second portion of the seabed seismic cable having a second length of jumper section.

9. The method of claim 8 wherein the first length of jumper section and the second length of jumper section are both made up of one or more standard length jumper sections.

10. The method of claim 8 wherein the first length of jumper section comprises a first standard length of jumper section and the second length of jumper section comprises a second standard length of jumper section.

11. The method of claim 1 wherein the deployment step comprises deploying identical jumper sections.

12. The method of claim 1 wherein the deployment step comprises deploying non-identical jumper sections.

13. The method of claim 1 wherein the deployment step comprises deploying identical standard size jumper sections.

14. The method of claim 1 wherein the deployment step comprises deploying a first portion of the seabed seismic cable having a first length of jumper section, followed by deploying a second portion of the seabed seismic cable having a second length of jumper section.

15. The method of claim 1 wherein the first length of jumper section and the second length of jumper section are both made up of one or more standard length jumper sections.

16. The apparatus of claim 2 wherein the jumper sections are equal in length.

17. The apparatus of claim 16 wherein the jumper sections are a standard length.

18. The apparatus of claim 16 wherein two or more jumper sections are deployed between each active section.

19. The apparatus of claim 2 wherein a first portion of the seabed seismic cable has a first length of jumper section, and a second portion of the seabed seismic cable has a second length of jumper section.

* * * * *